(12) United States Patent
Colasurdo et al.

(10) Patent No.: US 7,543,066 B2
(45) Date of Patent: Jun. 2, 2009

(54) METHOD AND APPARATUS FOR MAINTAINING SESSION AFFINITY ACROSS MULTIPLE SERVER GROUPS

(75) Inventors: David B. Colasurdo, Raleigh, NC (US); Srinivas Hasti, Durham, NC (US); Gabriel G. Montero, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1796 days.

(21) Appl. No.: 09/845,502

(22) Filed: Apr. 30, 2001

(65) Prior Publication Data

US 2002/0161839 A1 Oct. 31, 2002

(51) Int. Cl.
*G06F 15/16* (2006.01)
(52) U.S. Cl. ........................ 709/228; 709/203
(58) Field of Classification Search ................ 709/203, 709/217–218, 227, 228; 719/105
See application file for complete search history.

(56) References Cited

U.S. PATENT DOCUMENTS

| | | | | |
|---|---|---|---|---|
| 6,098,093 | A * | 8/2000 | Bayeh et al. | 709/203 |
| 7,139,792 | B1 * | 11/2006 | Mishra et al. | 709/203 |
| 7,197,547 | B1 * | 3/2007 | Miller et al. | 709/223 |
| 7,349,970 | B2 * | 3/2008 | Clement et al. | 709/228 |
| 2001/0039586 | A1 * | 11/2001 | Primak et al. | 709/228 |
| 2002/0007415 | A1 * | 1/2002 | Douglis et al. | 709/230 |
| 2002/0010783 | A1 * | 1/2002 | Primak et al. | 709/228 |
| 2002/0073211 | A1 * | 6/2002 | Lin et al. | 709/229 |
| 2002/0143958 | A1 * | 10/2002 | Montero et al. | 709/228 |

FOREIGN PATENT DOCUMENTS

EP 11041496 A2 * 4/2000

* cited by examiner

*Primary Examiner*—Douglas B Blair
(74) *Attorney, Agent, or Firm*—Saul Ewing LLP; A. B. Clay

(57) ABSTRACT

The invention is a method and apparatus for maintaining session affinity within a server farm when requests sharing a session ID switch between server groups or between server clones in a single server group. In accordance with the invention, client requests include a list of clone identification codes, each code uniquely identifying a clone within a server group for handling the request. The clone identification code may be appended to a session identification code. For each different server that handles a request in a session, a new clone identification code is appended without deleting or overwriting any previously appended clone identification codes. When a request is received, the list of clone identification codes associated with the request is parsed in a predetermined order to search for the first clone identification code that matches one of the clone identification codes of a server in the appropriate server group. If a match is detected, the request is dispatched to that clone. If no match is found, the request is dispatched to a server clone in the server group using any reasonable Work Load Management (WLM) mechanism and then the clone identification code of the selected clone is added to the list.

25 Claims, 2 Drawing Sheets

METHOD AND APPARATUS FOR MAINTAINING SESSION AFFINITY ACROSS MULTIPLE SERVER GROUPS

FIELD OF THE INVENTION

The invention pertains to server groups in distributed networking environments. More particularly, the invention pertains to routing of client requests to particular servers in a server farm comprising multiple server groups, each server group comprising multiple server clones.

BACKGROUND OF THE INVENTION

By now, almost everyone is familiar with the Internet and the World Wide Web (the Web). The Internet is a collection of interconnected communication networks that span the globe. Information content on the Internet is presented via pages, each page comprising a file that is stored on (or dynamically built by) a computer server that is coupled to the Internet and assigned a Uniform Resource Locator (URL), which is essentially an address on the Internet.

Hypertext transfer protocol (http) is the protocol used for transferring Web pages over the Internet. Servers are computers that form part of the Web and whose general purpose is to provide (or serve) information to other computers coupled to the Web. Those computers that are used to access information via the Web from servers are typically termed client machines or client computers.

Web browsers are computer programs that run on client machines that enable one to access and view Web pages via direct addressing (typing the address of a Web page in an address field of the browser) and/or by hyperlinking, as is well known in the art. Netscape Navigator and Microsoft Explorer are two of the most common Web browsers in use today. In the terminology of this specification (as well as in the pertinent industries), the accessing of a Web page by a client machine is called a "request" or an "http request."

In a common example, a customer accesses a Web retailer's Web site from a desktop computer using a Web browser. The customer's desktop computer utilizing the Web browser software would be considered a client machine.

The Web browser requests a particular Web page using http in a manner well known to those of skill in the art. Upon receipt of the request for a particular Web page, the server corresponding to the URL of the requested page serves the HTML code for that page to the client machine via the Internet.

Http is a connectionless transfer protocol. This means that each request for a Web page transmitted from a client to a server is completely freestanding and contains no http information that relates that request to any other requests. Thus, http itself has no provision for state information that would allow a server (or a client) to maintain historical information about a series of related http requests (e.g., consecutive requests for pages from a single Web site by a single client).

While the discussion so far has referred to a Web site server in the singular, it actually is common for a high traffic Web site to operate a multiplicity of servers, collectively termed a server farm, to service requests from clients. The term server is frequently used in the relevant industries to refer to different physical computers. However, it also is loosely used in the relevant industries to refer to a software module that is dedicated to a particular server task. Thus, when the term is used in this latter manner, two or more servers can reside on a single computer. In this specification, we will use the term server in the latter, broader sense unless otherwise noted.

The number of ways that a Web site operator can divide computing tasks among multiple physical computers and software modules is virtually limitless. For example, a server farm may have an http server at its front end interfacing to the Internet that processes the transfer aspects of a transaction, such as parsing the requests and dispatching them to an appropriate application server in the farm based on one or more of (1) content specific information in the request, (2) load balancing considerations, and (3) session affinity considerations (all of which are discussed in more detail later in this specification). Then, separate application servers may handle the content-specific processing for the transactions. For instance, in a retail Web site, the application server typically would run at least two applications, namely, a first application that builds and serves Web pages dynamically responsive to specific requests from clients. This application, herein termed the "front-end" or "shopping" application, is what allows a client to navigate through a retail Web site to identify goods for purchase and add them to a virtual shopping cart, as is well known in the art.

When the individual using the client machine wishes to check out, a second application, herein termed the "back-end" or "business" application, takes over and processes the collected data for a purchase. The business application, for example, may perform such tasks as creating an invoice, creating a bill of lading, checking inventory to determine if the ordered item is in stock, checking the individual's credit card information to confirm validity and the availability of sufficient credit for the purchase, determining shipping costs, and taxes and calculating a total cost. If a Web site receives enough traffic, the shopping application(s) and the business application(s) may be handled by different servers.

There might also be a separate database server that stores databases needed to process requests. Such databases may include, for instance, a database of inventory, a database storing the content that is used to dynamically build Web pages, a database for calculating taxes and shipping costs based on the shipping address, etc. In a large volume Web site server system, not only might different tasks be assigned to different servers, but each task (or group of tasks) may have multiple, redundant, servers for performing those tasks. Particularly, any given server can only service so many requests in a given period. If the Web site expects more traffic than a single server can handle, it simply maintains multiple servers that are clones of each other. A collection of clone servers is commonly called a server group.

In many types of communication sessions between a particular client and a particular server system (i.e., Web site), it may be desirable to associate multiple http requests from a single client to a single Web site with each other so as to be able to maintain state information about a "visit" to the Web site by a particular individual. For instance, at retail Web sites, which commonly use dynamically generated shopping cart pages to keep track of items being purchased by a particular client, maintaining state information is a necessity in order to keep track of the various products selected by an individual for purchase so that a shopping cart page correctly reflecting the goods being purchased can be generated. Typically, each instance in which an individual selects another item for purchase will be contained in a different http request. Accordingly, the server farm must have some mechanism for associating the different http requests from a given client with each other in order to build a shopping cart page for that individual when he or she is ready to check out. Countless other examples exist in which it is useful or necessary to associate a series of requests from a single client machine with each other and maintain state data for that series of related requests.

The term "session" generally is used in the Web application development field to refer to a series of requests to a network server system for which the server system maintains state information. Typically, a session would comprise requests from a single client machine to a single server system that are within a certain time period of each other. The concept of sessions is not limited to use on the Internet or to http, but can be applied to any communication network using any protocol.

Accordingly, ways have been developed outside of the http protocol itself for maintaining such state (or session) information. One of the earliest ways developed for doing this was the use of cookies. Cookies are small pieces of data that a server sends to a client machine and that the client's Web browser knows to store in a designated cookie folder or in the browser memory. Thereafter, when that client sends a http request for a Web page to that server, the client's Web browser software sends the cookies associated with that URL to the server. The cookie might contain any particular information that the Web site operator feels the need to have in order to better service its customers. As an example, many Web sites allow individual clients to customize Web pages, such as a daily, electronic, newspaper containing only those articles that meet certain criteria selected by the customer and which criteria are stored as part of a cookie. Persons of skill in these arts will recognize that other mechanisms for storing state data are known. However, the use of cookies is probably the most ubiquitous of the various mechanism in use today.

Java is an object-oriented programming language developed by Sun Microsystems, Inc. expressly for use in the distributed environment of the Internet. It can be used to build small application modules, known as applets, that make it possible for a Web page user to interact with a page. Applets are small programs that can be delivered to a Web browser as part of an HTML page and that can execute at the client side to provide dynamic content and/or allow for interactivity. Web browsers that include a Java Virtual Machine (JVM) can run Java applets. For example, a Java applet can allow a user at a client machine to enter data onto a form.

A Java servlet essentially is a server-side equivalent of an applet. A Java servlet Application Program Interface (API) is a specific method prescribed by a computer operating system or by another application program by which a programmer writing an application program can make requests of the operating system or other application. A Java servlet API provides Web developers with a simple, consistent, mechanism for extending the functionality of a server and for accessing existing business systems, i.e., the application program with which the HTML code interfaces. Java servlets are server and platform independent.

The Javax.servlet.http.HTTPSession object (commonly called HttpSession) is an object of a Java servlet API and is a newer way of maintaining state information at the server side. Javax.servlet.http.HTTPSession is a Java servlet object that uses cookies and builds on the cookie concept (as well as some of the other means of tracking state data) in a layer on top of the http layer. It is built using cookies (and/or other existing state data tracking techniques) and associates http requests with those cookies (and/or the particular data pieces used in other data tracking techniques). For further information concerning HttpSession, Java servlet APIs and the other matters discussed above, reference can be made to the Java Servlet 2.2 (or later) specification.

Since the present invention will be described in this specification in connection with specific embodiments adapted to the Java Servlet 2.2 scheme, a discussion of some pertinent Java Servlet 2.2 terminology and rules is in order. First, in Java Servlet 2.2 (hereinafter Servlet 2.2), a session ID (identification) is a code that defines a set of related requests (typically, but not necessarily, requests from one particular client within a certain period of time of each other). When a server creates a session, it assigns a unique session ID value that is sent back top the client machine under the name jsessionid. Thereafter, the client machine will include the session Id in all requests issued to that server farm. The session ID might be sent in a cookie that forms part of the request. Alternately, it might be appended to the URI of the request in a mechanism known as URL rewriting.

The actual state information is called the "session" in Servlet 2.2. In Servlet 2.2, a session ID may be shared across multiple applications and servers, but not the session (i.e., the actual state information). However, it is possible for applications to share data through other means. One such way is through the use of a database.

Since http is a connectionless protocol, one request in a particular session can be directed to one clone in a server group while the next request in the same session might be directed to another one of the clones in that server group. Accordingly, often a mechanism is provided for allowing different servers in a server group to share session data. Such mechanisms are commonly termed session persistence mechanisms. One common persistence mechanism of enabling such sharing of http session data is the use of a database server for storing session data and that is accessible to the plurality of application servers. Particularly, an application server will store session data in local memory, but may also write a copy of the session data to the session database. When a different server clone services a request in that session, that different server can go to the database and read out the session data for that session.

However, reading session data from the database is undesirable because it is an expensive operation in terms of time and use of system resources. Accordingly, many server systems utilize an affinity scheme that attempts to direct all requests sharing a session ID to the same clone in a server group. In such a scheme, a request having a particular session ID would be directed to a different clone in a server group only in the case of the original server for that session failing.

In a complex, large scale, server farm such as described above, it is often the case that a set of requests having a particular session ID may be handled by a server in a first server group, then a next set of requests sharing the same session ID are handled by a server in a different server group, and then a next set of requests sharing the same session ID must be handled by a server in the first group again. As merely one example, an individual shopping on a large retail Web site may first add several items to a virtual shopping cart, which http requests are handled in the front end application server or server group that is dedicated to the shopping application. The individual may then check out, wherein, in this particular Web site, the check out application processes are handled by a different server or server group. Then, partially through the check out procedure, the individual may decide to add another item to the shopping cart. Accordingly, the client machine issues http requests that return the servicing of the requests back to the first server group.

It is an object of the present invention to provide a method and apparatus for maintaining session affinity across multiple server groups.

It is another object of the present invention to provide a method and apparatus for maintaining session affinity within a server group when requests sharing a session ID switch from a first server group to a second server group and then return to the first server group.

SUMMARY OF THE INVENTION

The invention is a method and apparatus for maintaining session affinity within a server group when requests sharing a session ID switch between server groups or even in a single server group. Particularly, the invention provides a mechanism for assuring that requests for data sharing any given session ID are directed to the same clone within a server group whenever possible. In accordance with the invention, a software module for identifying a session ID of a request includes, in addition to a session identification code, a clone identification code that uniquely identifies a clone within a server group for handling the request. The clone identification code may simply be appended to the end of the session identification code. For each different server group that handles a request having a particular session ID, a new clone identification code is appended without deleting or overwriting any previously appended clone identification codes. In fact, even within a server group, if two different server clones handle different requests sharing a session ID, such as might be the case if a clone within the server group that first handled requests having a particular session ID fails, the second clone simply appends its clone identification code without overwriting or deleting any other clone identification codes appended to the session identification code.

Whenever a request is received, a software module parses the universal resource identifier (URI) of the request to determine the server group to which the request must be directed. The module then retrieves the clone identification codes for all of the clones in that server group. It then parses the received request in a predetermined order (e.g., from left to right) searching for the first clone identification code that matches one of the clone identification codes for that server group. If a match is detected, it dispatches the request to that clone. If no match is found, it can dispatch the request to any clone within the server group using any reasonable Work Load Management (WLM) mechanism as a backup. It would then append the clone identification code of the clone selected by the WLM to the session identification code.

The invention is particularly suited to use in environments in which session identification codes are maintained through the use of cookies. It can also be applied in cases where session identity is maintained as an appendage to the URL of a request, i.e., URL rewriting.

DETAILED DESCRIPTION OF THE INVENTION

The invention will herein be described in connection with a server farm serving requests received over the Internet and using jsessionid of Servlet 2.2. However, it will be understood by those of skill and the art that this is merely one example of an environment in which the present invention may be applied and that the invention can be applied to essentially any server farm comprising multiple server groups and in connection with any manner of maintaining state data for a communication session.

Figure 1:
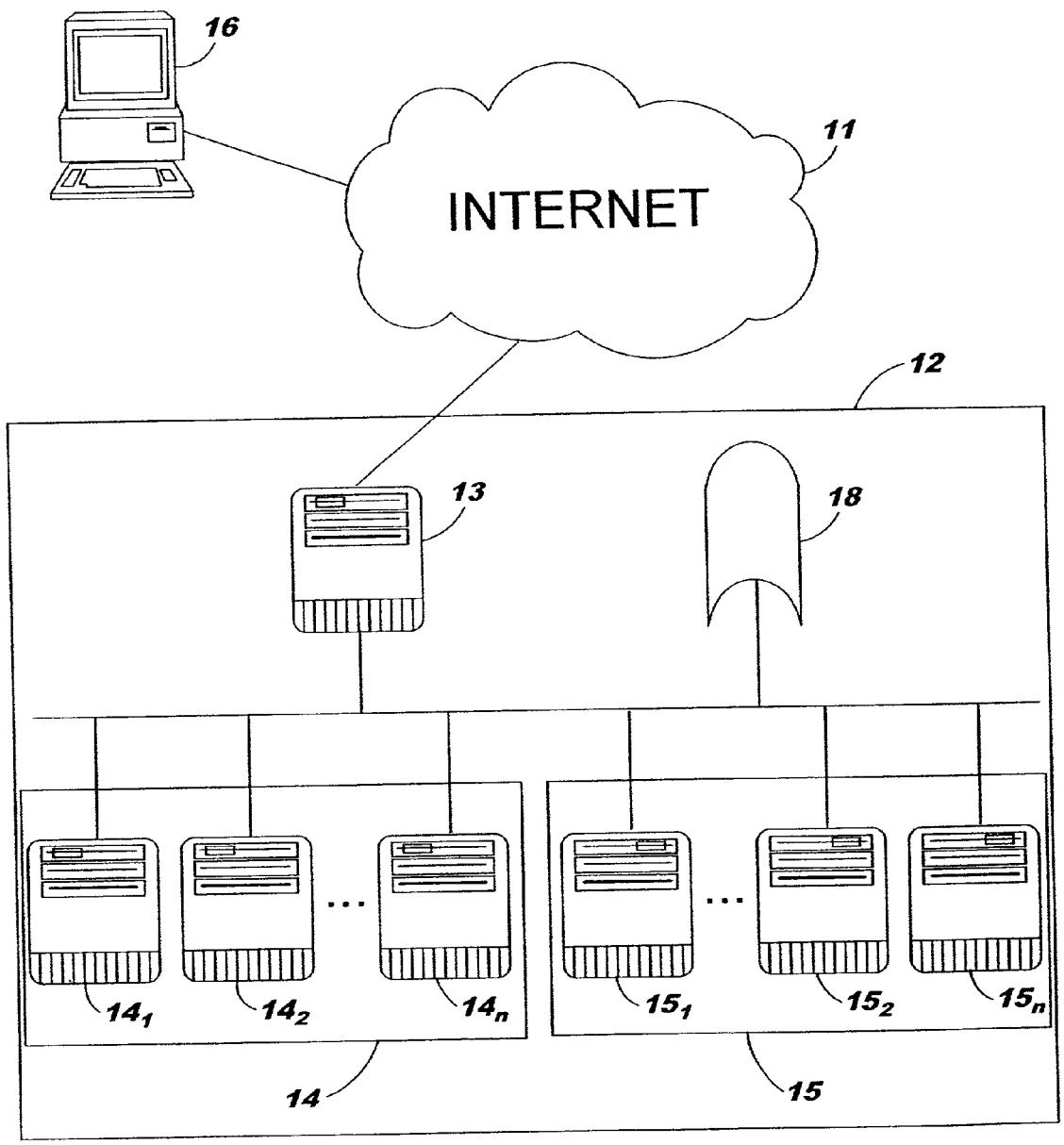
FIG. 1 is a block diagram showing a network system architecture including a server farm in accordance with the present invention.

FIG. 1 is a block diagram illustrating the basic principles and components involved in communication sessions using the Internet. As previously noted, the Internet 11 essentially is a distributed communication network that spans the globe. An individual wishing to view Web pages via the Internet runs Web browser software on his or her computer (the client machine) 16. Web browsers are capable of communicating using http, ftp and other protocols. A client Web browser can issue http requests via the Internet 11 to any particular server system for content to be presented to it in the form of HTML pages. When a Web site server farm 12 receives such a request, it returns the requested HTML page to the requesting client. A Web site operator operating a server farm 12 couples to the Internet 11 through an http server 13. Let us assume for simplicity that this server farm 12 is operated by a single large scale retailer operating one Web site. The http server 13 handles all tasks relating to interfacing to the clients via the Internet using http, ftp, etc. If the traffic to the Web site was substantial enough, the Web site might require a plurality of servers 13.

The http server 13 is coupled to a plurality of front-end application servers $14_1, 14_2, \ldots, 14_n$. The front-end application servers handle the such tasks as dynamically building Web pages responsive to client requests. Each front-end application server $14_1, 14_2, \ldots, 14_n$ is a clone of each other application server. Thus, front-end application servers $14_1, 14_2, \ldots, 14_n$ collectively form a first server group 14 of this server farm 12.

The http server 13 further couples to a plurality of back-end application servers $15_1, 15_2, \ldots, 15_o$. Each back-end application server $15_1, 15_2, \ldots, 15_o$ is a clone of each other back-end application server. Thus application servers $15_1, 15_2, \ldots, 15_o$ collectively form a second server group 15 of this server farm. The back-end server group 15 serves business functions generally associated with checking out after selecting goods for purchase and includes such tasks as creating a purchase order, creating an invoice, checking stock to determine if a requested product is available, creating a shipping order, calculating tax and shipping charges, adding such charges to the price of the item being purchased, checking the validity of a credit card number used to charge for the purchase, etc.

Each clone in a server group 14, 15 has access to the same system resources and can perform the same processing tasks as every other clone in the group. Accordingly, any of the clones can service any request received via the Internet that is within the tasks assigned to that server group.

In addition, the server farm includes a database server 18 for storing content needed by the application server groups 14 and 15 that may be necessary for processing requests. If sufficient demand existed, the server farm might comprise a database server group comprising multiple cloned servers. However, for exemplary purposes, we shall assume that the nature of the Web site of this server farm requires only one database server 18 to service the database needs of the back-end application servers.

The servers in the back end application server group 15 access necessary data for performing these tasks, such as inventory data, pricing data, shipping cost data, etc. from the database server 18. The servers in the front end server group 14 access the database server 18 to retrieve information needed to build the Web pages such as product information, page layout templates, etc.

As previously described, several techniques are known for maintaining session data for a collection of related client requests. Each server that services a client request in a given session may maintain session data for that session. Merely one example of a mechanism for maintaining session data is the aforementioned HttpSession object in the Java programming language. The Servlet 2.2 specification contains a full disclosure concerning the structure, nature and operation of the HttpSession object, is incorporated herein by reference and can be referred to for a full description thereof. The invention will be described with respect to a particular embodiment using the HttpSession object. However, it will be understood by a person of the skill and the art that the invention has broader application and that this is merely an exemplary embodiment of the invention.

A first set of requests having a particular session ID may be serviced in a first server group, a next set of requests sharing the same session ID may be serviced in a second server group and then a next set of requests sharing that same session ID might be serviced in the first server group again. Accordingly, it would be beneficial to provide a mechanism by which it can be assured that requests sharing a given session ID are directed to the same server of a server group when processing control leaves that server group and then later returns. At least one reason this would be beneficial is because the server that had previously serviced the requests in that session may have a copy of the session data in memory. If the requests sharing that session ID are directed to a different server in the server group that had not previously serviced requests with that session ID, then that server will have to retrieve the session data from a session database, as previously described.

The HttpSession object may use cookies to maintain state information. Specifically, a cookie can identify the particular session with a unique identification code. Servlet 2.2 also allows for providing session identification by URL rewriting, in which case the session ID (still named jsessionid) is appended to the URL of a request, rather than being contained in a cookie. Reference can be made to the Java Servlet 2.2 specification for more information concerning session maintenance using cookies and URL rewriting.

As previously mentioned, in Servlet 2.2, the "session" (i.e., the actual state information) cannot be shared across different Web applications or server groups. However, the session ID, whether maintained by a cookie, URL rewriting or by another mechanism can be shared across Web applications. In this specification, we shall refer to the session identification code by the term jsessionid, consistent with the terminology of Servlet 2.2.

Jsessionid takes the form:

jsessionid=abcdefg where abcdefg is a unique session identification code.

When a browser sends a request via the Internet that is directed to the server farm 12, the http server 13 receives the request. Http server 13, running a request dispatch routine for directing requests to an appropriate server based on factors such as content-based rules, load balancing rules and session affinity rules, reviews the request to determine to which server it must be dispatched. Typically, the request dispatch routine will first determine which server group handles requests of that type (i.e., content-based factors which are usually derived from the URI of the request). Then, it will select a particular clone in that server group taking into consideration at least session affinity rules (e.g., it will try to send the request in any given session to the same server in the group) and load balancing rules (i.e., it will attempt to spread the request load evenly among the server clones in the group).

The selected server then receives the request and can retrieve the session data as needed (from its own local memory, if that server had serviced previous requests sharing the same session ID, or, if not, from a session database or other session persistence mechanism, if one is used).

A unique clone identification code identifying a specific clone within a server group can be appended to the jsessionid as shown below:

jsessionid=abcdefg:ucid123     (1)

where ucid123 is a unique clone identification code. Accordingly, when a front-end request dispatch software module receives requests corresponding to any given session and server group, it can read the clone identification code appended to the jsessionid and direct them always to the same clone in the server group whenever possible. However, when a request having a session ID must be routed to a different server group that had previously not serviced requests sharing the same session ID, the unique clone identification code is overwritten with the unique clone identification code of the particular clone in the new server group. Accordingly, the information needed to return to the same clone in the first server group should processing switch back to tasks performed by the first server group, the information necessary to return to the same clone in the first server group is lost.

Accordingly, if and when a subsequent request with the same session ID is received that must again be serviced by a server in the first server group, there is no way to assure that the request is serviced by the same server that previously serviced requests with that session ID. Accordingly, the session data either has to be rebuilt or an external session persistence mechanism has to be employed, such as a session database that stores copies of the session data for all sessions maintained by all servers, as previously described. Accordingly, if the request is serviced by a server in the first server group that did not service previous requests with that session ID, the server could go to the database to retrieve any session data for that session built by any other server clone in that server group. In this manner or by use of any other well known session persistence mechanism, the session data could be shared among the server clones in a server group. However, the need to read data from a session database is a significant burden in terms of time consumption and required processing power.

In accordance with the present invention, this problem is solved by, instead of overwriting the clone identification code whenever there is a change in the server group processing the requests for a particular session ID, appending additional clone identification codes to the session ID without deleting or overwriting previous unique clone identification codes, thereby creating a list of clone identification codes associated with each session ID.

Using the server farm of FIG. 1 as an example, let us assume that a session between a particular client machine 16 and the server farm 12 has been created and serviced in the front-end application server group 14, and particularly server $14_3$. In accordance with the invention, server $14_3$ created the following jsessionid cookie:

jsessionid=abcdefg:ucidsg14c3     (2)

where
   abcdefg=the unique session identification code,
   ucid=a unique code which identifies the information after the colon as a unique clone identification code,
   sg14=a portion of the unique clone identification code which identifies the server group to which the clone belongs, i.e., server group 14, and
   c3=a unique code which identifies the particular clone, i.e., clone $14_3$.

Let us assume that the individual operating the client machine then proceeds to check out. Thus, the next series of requests will be serviced by a clone in server group 15. Accordingly, the URI associated with checking out identifies server group 15 and the request dispatcher running in the http server 13 selects one of the clones in server group 15 to service the request, e.g., clone 15$_2$. That clone then appends to the jsessionid in the relevant cookie a second unique clone identification code as shown below:

$$\text{jsessionid=abcdefg:ucidsg14c3:ucidsg15c2} \tag{3}$$

As subsequent requests with that session ID are received after the modification of the jsession ID, the request dispatcher will parse the session ID from left to right so as to encounter session IDs in the temporal order in which they were added to the list. It will know from the URI of the request which server group must serve the request. Accordingly, if the URI is associated with server group 15, then the request dispatcher will ignore the first unique clone identification code in the jsession ID since it indicates that it is identifying a clone in a different server group. When it hits the second unique clone identification code in the jsessionid, it will detect a match and send the request to the corresponding clone.

If, for instance, the person operating the client machine associated with this particular session then decides to go back and shop some more on the Web site, the client machine sends a URI to the server farm that requires processing in the first server group again. As usual, the request dispatcher will determine the appropriate server group from the URI and will parse the jsessionid cookie from left to right and will now use the first unique clone identification code when it encounters it to send the request to the same server clone that had serviced previous requests with that session ID and thus, hopefully, already has the session data stored locally.

As many unique clone identification codes can be appended to the jsessionid as there are server groups that service a request in the session.

In fact, the invention can be applied even in the instance of switches in server clones within a single server group such as might occur in the case of a fail-over, i.e., a server clone serving a particular session failing.

For instance, let us assume that a request having jsessionid (3) above, including the two appended unique clone identification codes, requires servicing by the first server group 14 as mentioned above. However, this time let us assume that clone 14$_3$ in server group 14 has failed. The request dispatcher will first attempt to send the session to clone 14$_3$. When it determines that clone 14$_3$ is down, it will assign a different clone, e.g., clone 14$_1$, to service the request. When clone 14$_1$ receives the client request, it will append its unique clone identification code at the end of the jsession ID to form the jsession ID shown below:

$$\text{jsessionid=abcdefg:ucidsg14c3:ucidsg15c2:} \\ \text{ucidsg14c1} \tag{4}$$

Assuming that there is a persistence mechanism such as a session database, server 14$_1$ will then retrieve the session data built by clone 14$_3$ from the database and service the request. The next client request sharing this session ID that needs to be serviced by the front-end application server group will be parsed by the request dispatcher, which will then encounter the first unique clone identification code. The affinity module will recognize that server 14$_3$ is down and, thus, will continue parsing the jsessionid. It will skip the second unique clone identification code since it belongs to the wrong server group and will then encounter the third unique clone identification code and send the request to the clone identified in that identification code, i.e., clone 14$_1$.

Note that, when server 14$_3$ comes up again, requests sharing that session ID that need to be serviced in server group 14 will then automatically start being sent back to clone 14$_3$ and not to clone 14$_1$. This inherently helps improve load balancing by returning all requests to the original server, thus tending to reassign requests so as to result in a more balanced load distribution.

Note that the aforementioned jsessionids of Servlet 2.2 are merely exemplary and illustrate some features which, in some embodiments, are not necessary. For instance, if the only appendage allowed for a jsession ID is a clone identification code, then there is no need for a portion of that clone identification code to indicate that it is a clone identification code. In other words, the ucid### portion of the code is not necessary. Further, there is no need for a distinct portion of the clone identification code to specify the server group as long as each server in the server farm has a unique ID. In fact, since the URI associated with the request typically indicates the particular server group, the sg## portion of the unique clone identification code typically will be superfluous. In essence, the unique clone identification code simply needs to be a code which uniquely identifies a server in the server farm.

Use of the cookie feature of Java servlet 2.2 is merely an embodiment of the invention. As another example, the invention can be applied in a URL rewriting environment. As is well known to those of skill in Java programming, another way of indicating a particular session to which a request belongs is commonly termed URL rewriting. In URL rewriting, instead of using jsessionid cookies, the session Identification code is merely appended at the end of the URI as a parameter with the name jsessionid. In an exemplary URI in which session identification is maintained by URL rewriting, the URI of a request may appear as follows:

www.retailer.com/sneakers/child_sizes/xyz; jsessionid=abcdefg:ucidsg14c3:ucidsg15c2

Operation in accordance with the present invention is essentially the same as described above in connection with the embodiment in which session identification data is maintained with the use of jsessionid cookies.

Further, the invention can readily be embodied into a scheme that allows actual session data to be shared across multiple applications.

Figure 2:
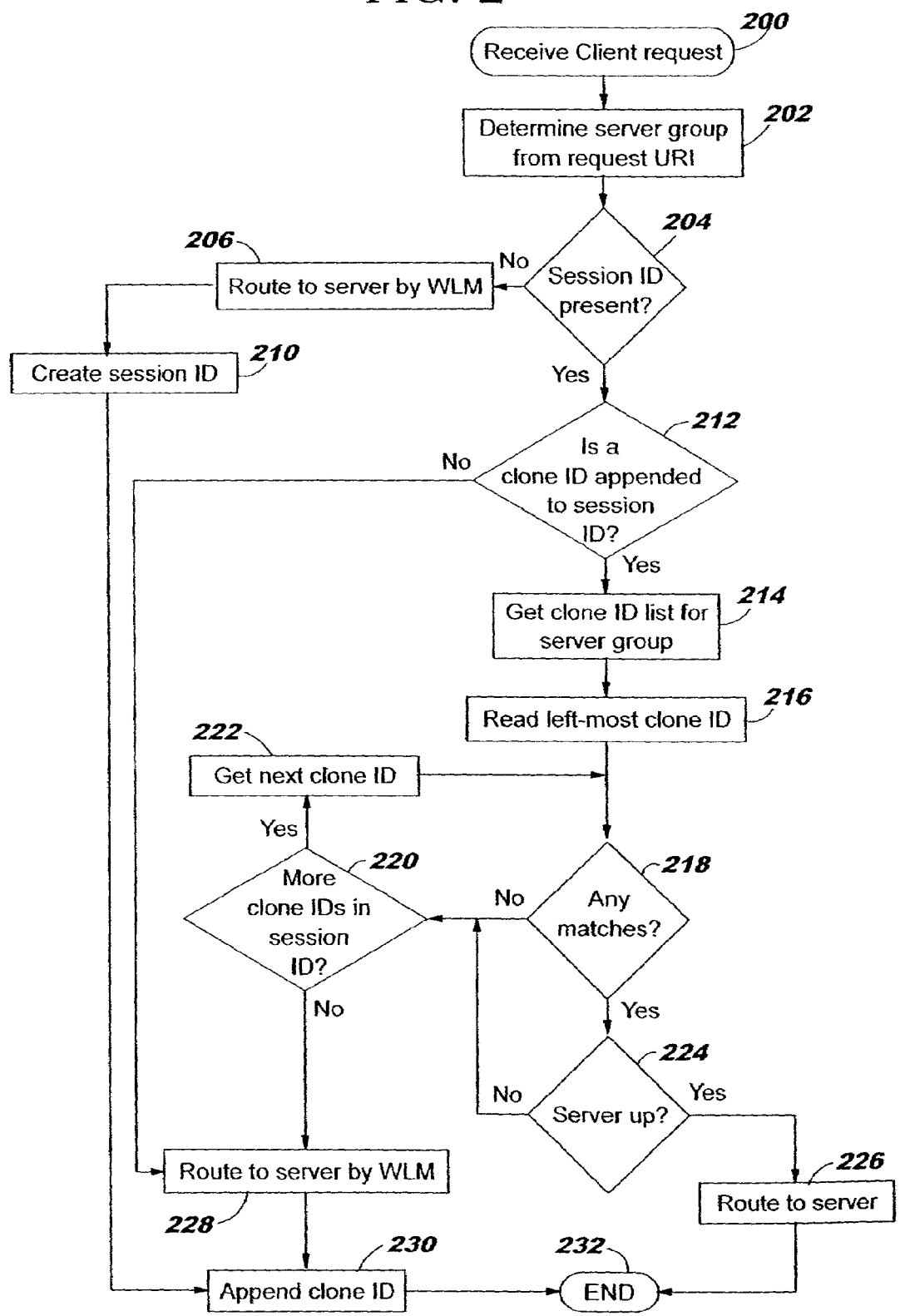
FIG. 2 is a flow diagram illustrating process flow in accordance with the present invention.

FIG. 2 is a flow chart illustrating operation with the present invention. The processing shown in FIG. 2 can be performed by a software module of the request dispatcher of a server farm. The request dispatcher would dispatch the requests to the individual servers in the farm in accordance with an overall scheme that takes into account the session affinity scheme of the present invention, a load balancing scheme and the applicable content-based routing/dispatching rules. The request dispatcher may run on the http server, such as server 13 in FIG. 1 or may be a stand-alone computing device that front ends the entire server farm and interfaces directly to the network. Referring to the flowchart, in step 200, the request dispatcher receives a client request. In step 202, the plugin determines the server group to which the client request corresponds based on the URI of the request. Flow then proceeds to step 204. In step 204, it determines whether the request includes a session ID. If not, flow proceeds to step 206 where the request is routed by whatever other Work Load Management (WLM) mechanism the server farm uses. From step 206, flow proceeds to step 210 where the server clone creates a session ID for the session. Flow then proceeds to step 230, where the clone ID of the server to which the request was sent is appended to the session ID.

However, assuming that session ID is enabled, flow instead proceeds from step 204 to step 212. In step 212, the request dispatcher parses the session ID and determines whether there is a clone ID appended to the session ID. If not, flow proceeds to step 228, where the request is routed by whatever other Work Load Management (WLM) mechanism the server farm uses. From step 228, flow proceeds through steps 230 and 232, where the ID of that clone is appended to the session ID, and the process ends.

If there is a clone ID appended to the session ID, flow instead proceeds from step 212 to step 214. In step 214, the request dispatcher retrieves a list of the clone IDs of all of the clones in the appropriate server group. Flow then proceeds to step 216, where the request dispatcher reads the left-most clone ID in the session ID. Flow then proceeds to step 218 where the request dispatcher determines whether the selected clone ID matches with any of the clone IDs from the list of clone IDs in the corresponding server group. If there is no match, flow proceeds to step 220. In step 220, it is determined whether there are any more clone IDs appended to the session ID. If so, flow proceeds to step 222 where the request dispatcher reads the next clone ID and then returns to step 218 to determine whether any of the clones in the server group match that next clone ID. Flow will proceed through steps 218, 220 and 222 until either a match is detected or there are no other clone IDs to check. Assuming that it is determined in step 220 that there are no other clone IDs to check, flow proceeds through previously-described steps 228, 230 and 232, in which the client request is routed by whatever other WLM mechanism is in use and the server farm and the clone ID of the newly selected clone is appended to the session ID.

If, on the other hand, a match is detected in step 218, flow proceeds from step 218 to step 224. In step 224, the request dispatcher determines whether the server that matched the clone ID appended to the session ID is functioning. If it is functioning, flow proceeds to step 226 where the request dispatcher routes the requests to that server. The process then ends at step 232. If, on the other hand, the server is not up, flow proceeds to step 220, to determine if there are any other clone IDs. Flow then proceeds from step 220 through step 222 or steps 228, 230, 232, as previously described to select a clone by whatever other WLM mechanism is in use and then append that clone ID to the session ID.

Having thus described a few particular embodiments of the invention, various alterations, modifications, and improvements will readily occur to those skilled in the art. For instance, it should be apparent that, while the invention has been described in connection with the appending of clone ID information to the jsessionid parameter of the Java programming language, it has much broader application. There is no requirement that the invention be an appendage to jsessionid. For instance, the unique clone identification code may be maintained as an entirely distinct object. It is merely a matter of associating a list of unique clone identification codes with the session. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of maintaining session affinity in a server farm coupled to receive client requests, said server farm comprising multiple server groups, each server group comprising multiple clone servers, said method comprising the steps of:
    (1) associating a collection of related client requests with a unique session identification code;
    (2) responsive to receipt of a client request, determining to which of said server groups said client request can be dispatched;
    (3) associating with said collection of requests sharing a session identification code a list of every server in said server farm that has serviced a request in said collection;
    (4) responsive to said receipt of a client request which comprises a session identification code, determining if said list associated with said received session identification code includes a server identification code that matches a server identification code of a server in said determined server group; and
    (5) if a match is detected, dispatching said client request to said matched server;
    wherein steps (1) and (4) comprise sending said session identification code and said unique server identification code, respectively, to a client machine that issued said request so that said client machine can include said session identification code and said unique server identification code as part of future requests it issues to said server farm.

2. The method of claim 1 wherein said list of server identification codes forms part of said session identification code.

3. The method of claim 2 wherein said list of server identification codes is appended to said session identification code.

4. The method of claim 3 wherein said session identification code is a jsessionid in accordance with the Java Servlet 2.2 specification.

5. The method of claim 3 wherein said session identification code forms part of a cookie associated with said session.

6. The method of claim 5 wherein said cookie forms part of said client request.

7. The method of claim 3 wherein said session identification code forms part of a Uniform Resource Identifier (URI) that forms part of said client request.

8. The method of claim 3 wherein step (3) further comprises the steps of:
    if a client request comprises a session identification code having appended thereto a server identification code corresponding to a particular server in said determined server group, but said particular server is unavailable to service said client request;
    (3.12) dispatching said client request to a different server in said determined server group;
    (3.13) appending a server identification code corresponding to said different server to said session identification code; and
    (3.14) communicating said session identification code, including said newly appended server identification code, to the client that issued said client request.

9. The method of claim 2 wherein step (4) comprises the steps of:
    (4.1) parsing said list in a manner so as to find matching server identification codes in the temporal order in which they were added to said list; and
    (4.2) selecting the first matching server identification code detected.

10. The method of claim 2 wherein step (3) comprises the steps of:
    if said client request does not comprise a session identification code;

(3.1) creating a session for client requests received from the client issuing said client request;

(3.2) assigning a session identification code to said session;

(3.3) dispatching said client request to a particular server in said determined server group;

(3.4) appending the server identification code of said particular server to said session identification code; and (3.5) communicating said session identification code with said server identification code to the client that issued said client request.

11. The method of claim 10 wherein step (3) further comprises the steps of:

when a client request is received that pertains to a particular server group and said client request comprises a session identification code, but said session identification code does not have appended thereto a server identification code corresponding to a server in said particular server group;

(3.6) dispatching said client request to a server in said particular server group;

(3.7) appending said server identification code corresponding to said server to said session identification code; and (3.8) communicating said session identification code, including said newly appended server identification code, to the client that issued said client request.

12. The method of claim 11 wherein step (3) further comprises the steps of:

if a client request comprises a session identification code having appended thereto a server identification code corresponding to a particular server in said determined server group, but said particular server is unavailable to service said client request;

(3.9) dispatching said client request to a different server in said determined server group;

(3.10) appending a server identification code corresponding to said different server to said session identification code; and (3.11) communicating said session identification code, including said newly appended server identification code, to the client that issued said client request.

13. A method of maintaining session affinity in a server farm coupled to receive client requests, said server farm comprising multiple server groups, each server group comprising multiple clone servers, said method comprising the steps of:

(1) associating a collection of related client requests with a unique session identification code;

(2) responsive to receipt of a client request, determining to which of said server groups said client request can be dispatched;

(3) associating with said collection of requests sharing a session identification code a list of every server in said server farm that has serviced a request in said collection;

(4) responsive to said receipt of a client request which comprises a session identification code, determining if said list associated with said received session identification code includes a server identification code that matches a server identification code of a server in said determined server group; and (5) if a match is detected, dispatching said client request to said matched server;

wherein step (4) comprises the steps of:

(4.1) searching said list in a predetermined order for matching server identification code, said predetermined order designed to encounter server identification codes in the temporal order in which they were added to said list;

(4.2) upon encountering a server identification code, determining if it matches a server identification code in said server group; and (4.3) if a match is not detected, repeating steps (4.1) and (4.2).

14. A computer readable product embodied on computer readable media readable by a computing device, said product for maintaining session affinity in a server farm coupled to receive client requests, said server farm comprising multiple server groups, each server group comprising multiple server clones, said computer program product comprising computer executable instructions for:

associating a collection of related client requests with a unique session identification code, different ones of said client requests in said collection of related client requests having been serviced by different ones of said servers;

responsive to receipt of a client request, determining to which of said server groups said client request can be dispatched;

associating with said collection of requests sharing a session identification code a list of every server in said server farm that has serviced a request in said collection;

responsive to said receipt of a client request which comprises a session identification code, determining if said list associated with said received session identification code includes a server identification code that matches a server identification code of a server in said determined server group; and if a match is detected, dispatching said client request to said matched server;

wherein said computer executable instructions for associating a collection of related client requests with a unique session identification code and said computer executable instructions for associating said list with said collection of requests comprise sending said session identification code and said unique server identification code, respectively, to a client machine that issued said request so that said client machine can include said session identification code and said unique server identification code as part of future requests it issues to said server farm.

15. The computer readable product of claim 14 wherein said list of server identification codes forms part of said session identification code.

16. The computer readable product of claim 15 wherein said list of server identification codes is appended to said session identification code.

17. The computer readable product of claim 15 wherein said session identification code is a jsessionid in accordance with the Java Servlet 2.2 specification.

18. The computer readable product of claim 15 wherein said session identification code forms part of a cookie associated with said session.

19. The computer readable product of claim 18 wherein said cookie forms part of said client request.

20. The computer readable product of claim 15 wherein said session identification code forms part of a Uniform Resource Identifier (URI) that forms part of said client request.

21. The computer readable product of claim 15 wherein said computer executable instructions for adding a unique server identification code comprises computer executable instructions for:

if said client request does not comprise a session identification code;
   creating a session for client requests received from the client issuing said client request;
   assigning a session identification code to said session;
   dispatching said client request to a particular server in said determined server group;
   appending the server identification code of said particular server to said session identification code; and
   communicating said session identification code including said server identification code, to the client that issued said client request.

22. The computer readable product of claim 21 wherein said computer executable instructions for adding a unique server identification code further comprises computer executable instructions for:
   when a client request is received that pertains to a particular server group and said client request comprises a session identification code, but said session identification code does not have appended thereto a server identification code corresponding to a server in said particular server group;
   dispatching said client request to a server in said particular server group;
   appending said server identification code corresponding to said assigned server to said session identification code; and
   communicating said session identification code, including said newly appended server identification code, to the client that issued said client request.

23. The computer readable product of claim 22 wherein said computer executable instructions for adding a unique server identification code comprises computer executable instructions for:
   if a client request comprises a session identification code having appended thereto a server identification code corresponding to a particular server in said determined server group, but said particular server is unavailable to service said client request;
   dispatching said client request to a different server in said determined server group;
   appending a server identification code corresponding to said different server to said session identification code; and
   communicating said session identification code, including said newly appended server identification code, to the client that issued said client request.

24. The computer readable product of claim 14 wherein said computer executable instructions for determining if said list associated with said collection of requests to which said request belongs includes a server identification code that matches a server identification code of a server in said determined server group comprises computer executable instructions for:
   parsing said list in a manner so as to find matching server identification codes in the temporal order in which they were added to said list; and
   selecting the first matching server identification code detected.

25. The computer readable product of claim 14 wherein said computer executable instructions for determining if said list includes a server identification code that matches a server identification code of a server in said determined server group comprises computer executable instructions for:
   searching said list in a predetermined order for matching server identification code, said predetermined order designed to encounter server identification codes in the temporal order in which they were added to said list;
   upon encountering a server identification code, determining if it matches a server identification code in said server group; and
   if a match is not detected, re-executing the searching and determining instructions.

\* \* \* \* \*